Feb. 13, 1923.

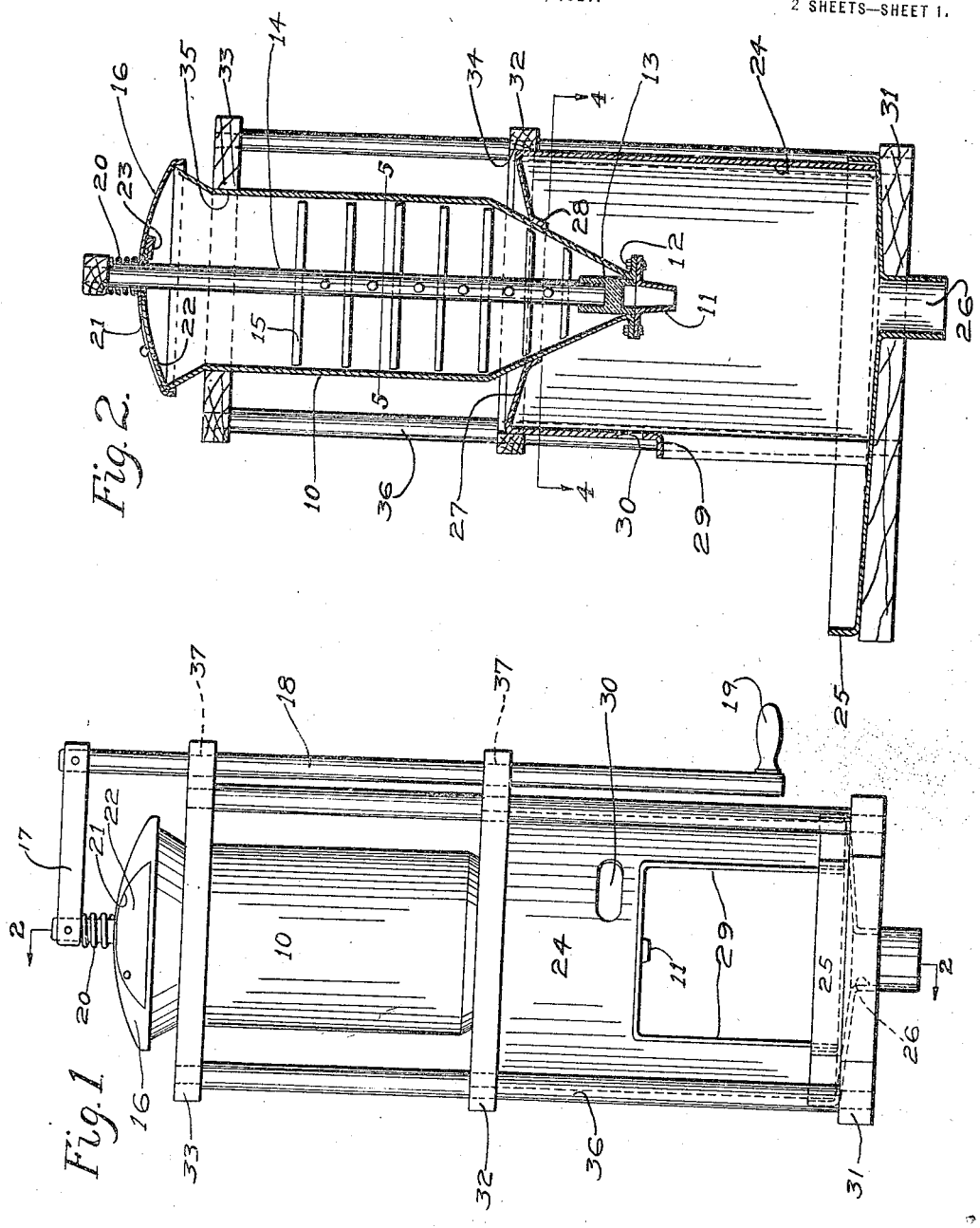

J. C. A. SITTLER.
BOTTLE FILLER.
FILED NOV. 15, 1921.

1,444,854.

2 SHEETS—SHEET 2.

John C.A. Sittler, Inventor

By *(signature)*

Attorney

Patented Feb. 13, 1923.

1,444,854

UNITED STATES PATENT OFFICE.

JOHN C. A. SITTLER, OF CHICAGO, ILLINOIS.

BOTTLE FILLER.

Application filed November 15, 1921. Serial No. 515,297.

*To all whom it may concern:*

Be it known that I, JOHN C. A. SITTLER, a citizen of the United States, residing at Chicago, in the county of Cook and State of Illinois, have invented new and useful Improvements in Bottle Fillers, of which the following is a specification.

This invention relates to apparatus for filling bottles and other containers, and consists of a hopper containing the material, and a reciprocatory plunger working in the hopper for forcing the material out of the same into the containers.

The invention has for its object to provide an apparatus of the kind stated embodying certain novel and improved features of construction and modes of operation to be described hereinafter, and in order that the same may be better understood, reference is had to the accompanying drawings forming a part of this specification.

Figures 3, 4:
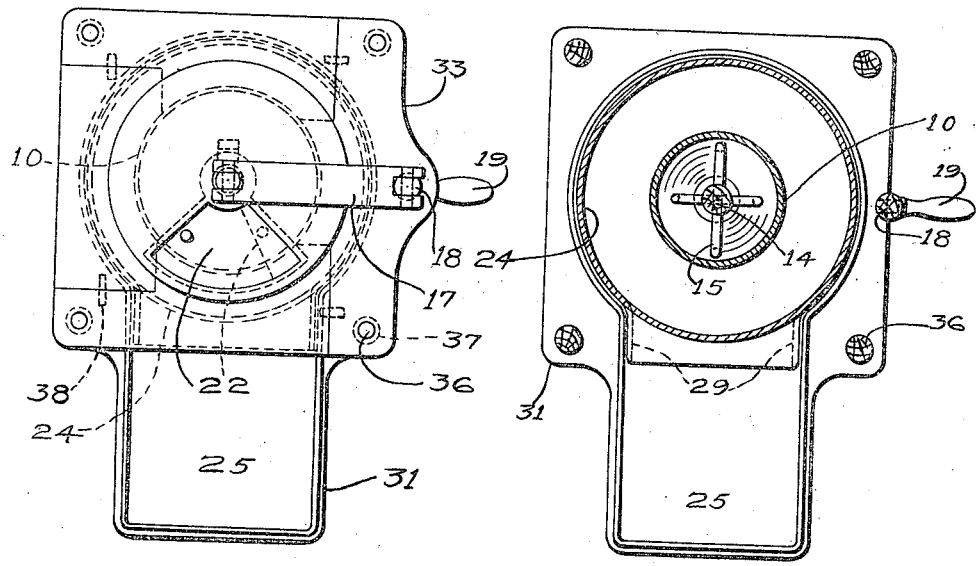
Figure 5:
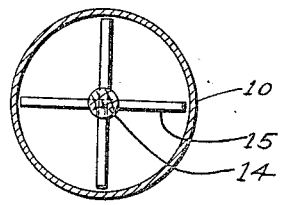

In the drawings, Figure 1 is an elevation of the apparatus; Fig. 2 is a vertical section on the line 2—2 of Fig. 1; Fig. 3 is a plan view; Fig. 4 is a horizontal section on the line 4—4 of Fig. 2, and Fig. 5 is a horizontal section on the line 5—5 of Fig. 2.

Referring specifically to the drawings, 10 denotes a hopper which is adapted to hold a supply of the material with which the bottles or other containers are to be filled. The apparatus has been designed more particularly for filling bottles with horseradish, but it is not limited to any particular material. The hopper is cylindrical and its lower or outlet end is made conical or tapered, and fitted with a nozzle 11, which is removable so that it may be replaced when worn. The nozzle, and the end of the hopper to which it is fitted, are flanged as shown in Fig. 2, and by means of bolts 12 passing through the flanges, the detachable connection of the nozzle with the hopper is made.

In the hopper 10 works a reciprocatory plunger 13 for forcing the material out of the same through the discharge nozzle 11. The bottle to be filled will be placed so that the nozzle 11 extends into the bottle mouth, and then by operating the plunger 13, the material in the hopper 10 is forcibly discharged through the nozzle into the bottle. The plunger 13 is carried by a rod 14 to the lower end of which it is suitably secured. The rod 14 is provided with radially projecting agitator arms 15 which serve to stir up the material and to force it downwardly in the hopper 10 when the rod 14 is reciprocated to operate the plunger 13.

The top of the hopper 10 is flared and provided with a cover 16, through a central opening in which latter, the upper end of the plunger rod 14 passes. Above the cover 16, the plunger rod 14 is connected to one end of a lateral arm 17 having its other end connected to an operating rod 18 positioned vertically alongside the apparatus, and having its lower end fitted with an actuating handle 19. Between the cover 16 and the arm 17, a spring 20 is coiled around the plunger rod 14, to give said rod an upward or return stroke, said spring being placed under compression on the downward or working stroke.

The cover 16 is provided with an opening 21 through which the hopper 10 may be filled without removal of the cover, said filler opening being provided with a closure consisting of a sliding door 22 having its lower edge working between the top edge of the hopper and the under side of the cover, whereas its opposite edge works on a guide strip 23 fastened to the bottom of the cover.

The lower portion of the hopper 10 extends into a cylindrical vessel 24 which is open at the bottom and here seats in a pan or tray 25 having a bottom which slopes in the direction of an outlet 26 in the latter. The vessel 24 is partially closed at the top, and in said top 27 is a flanged central opening 28 in which the lower tapered end of the hopper seats so as to locate the nozzle 11 inside the vessel. The vessel 24 has a front opening 29 and a sight opening 30. The opening 29 is provided for the purpose of permitting insertion into the vessel 24 of the bottles to be filled from the hopper 10 as hereinbefore described. The bottle can be held with one hand, leaving the other hand free to operate the plunger 13.

The supporting frame of the apparatus comprises a base plate 31 on which the pan or tray 25 seats, an intermediate plate 32 and a top plate 33. The plate 32 has an opening 34 in which the upper end of the vessel 24 seats and is held, and the plate 33 has an opening 35 to seat and hold the upper end of the hopper 10. From the base plate 31 rise posts 36 which pass through and support the plates 32 and 33, the two last-mentioned plates having guide apertures 37 for the plunger-operating rod 18.

The top plate 33 is made in sections, as shown in Fig. 3, held together by pegs 38, and the plate 32 is also constructed in a similar manner. The purpose of this construction is to permit the apparatus to be readily dismantled for cleaning the various parts.

The purpose of the pan or tray 25 is to catch any liquid escaping during the filling operation, the same discharging through the outlet 26, beneath which latter may be placed a vessel to catch the escaping liquid.

The apparatus can be set on a table or any other suitable support, and it can be easily taken apart and cleaned. The hopper 10 and the vessel 24 may be made of earthenware, aluminum or other material which can be kept in a sanitary condition.

I claim:

In a filling apparatus, a base, a pan seating in the base, an open-bottom vessel seating in the pan, said pan having an outlet, and the vessel having a top opening, a material hopper seating in said opening and having its outlet located in the vessel, said vessel having a side opening for access to the hopper, posts rising from the base, and apertured top and intermediate plates carried by the posts, the upper end of the vessel seating in the aperture of the intermediate plate, and the upper end of the hopper seating in the aperture of the top plate.

In testimony whereof I affix my signature.

JOHN C. A. SITTLER.